(12) United States Patent
Ho et al.

(10) Patent No.: US 6,918,063 B2
(45) Date of Patent: Jul. 12, 2005

(54) SYSTEM AND METHOD FOR FAULT TOLERANCE IN MULTI-NODE SYSTEM

(75) Inventors: Ching-Tien (Howard) Ho, San Jose, CA (US); Larry Joseph Stockmeyer, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 628 days.

(21) Appl. No.: 10/068,434

(22) Filed: Feb. 4, 2002

(65) Prior Publication Data

US 2003/0149908 A1 Aug. 7, 2003

(51) Int. Cl.[7] ............................................. G06F 11/00
(52) U.S. Cl. ............................. 714/43; 714/4; 370/217
(58) Field of Search ....................... 714/4, 43; 709/224, 709/225; 370/217

(56) References Cited

U.S. PATENT DOCUMENTS

| | | | |
|---|---|---|---|
| 5,371,744 A | 12/1994 | Campbell et al. ............. 371/8.2 |
| 5,435,003 A | 7/1995 | Chng et al. .................. 395/575 |
| 5,513,313 A | 4/1996 | Bruck et al. ............ 395/182.02 |
| 5,581,689 A | 12/1996 | Slominski et al. ...... 395/182.02 |
| 5,765,015 A | 6/1998 | Wilkinson et al. ...... 395/800.22 |
| 5,887,127 A | 3/1999 | Saito et al. ............. 395/182.02 |
| 5,963,546 A | 10/1999 | Shoji .......................... 370/255 |
| 6,038,688 A | 3/2000 | Yoon ............................. 714/43 |
| 6,104,871 A | 8/2000 | Badovinatz et al. ......... 395/670 |
| 6,130,875 A | 10/2000 | Doshi et al. ................. 370/225 |
| 6,202,079 B1 | 3/2001 | Banks .......................... 709/101 |
| 6,230,252 B1 * | 5/2001 | Passint et al. ................ 712/12 |
| 6,600,719 B1 * | 7/2003 | Chaudhuri ................... 370/228 |
| 6,680,915 B1 * | 1/2004 | Park et al. ................... 709/238 |
| 6,711,407 B1 * | 3/2004 | Cornils ........................ 455/428 |
| 6,760,777 B1 * | 7/2004 | Agarwal et al. ............. 709/238 |
| 6,856,627 B2 * | 2/2005 | Saleh et al. .................. 370/397 |
| 6,857,026 B1 * | 2/2005 | Cain ............................ 709/239 |
| 6,862,263 B1 * | 3/2005 | Simmons ..................... 370/217 |
| 2002/0133620 A1 * | 9/2002 | Krause ........................ 709/238 |

OTHER PUBLICATIONS

PUBLICATION: "Message Routing in an Injured Hypercube". Chen et al. Hypercube Concurrent Computers and Applications. Proceedings of the third conference on Hypercube concurrent computers and applications. vol. 7, pp. 312–317. Jan. 19–20, 1988.
PUBLICATION: "Origin–Based Fault–Tolerant Routing in the Mesh". Libeskind–Hadas et al. High–Performance Computer Architecture, 1995. Proceedings, first IEEE Symposium. pp. 102–111. Jan. 22–25, 1995.
PUBLICATION: "Folded Pertersen Cube Networks: New Competitors for the Hypercubes". Ohring et al. Parallel and Distributed Processing. Proceedings of the Fifth IEEE Symposium. pp. 582–589. Dec. 1–4, 1993.
PUBLICATION: "Computing in the RAIN: A Reliable Array of Independent Nodes". Bohossian et al. Parallel and Distributed Systems, IEEE Transactions. vol. 12, pp. 99–114. Feb., 2001.

* cited by examiner

*Primary Examiner*—Scott Baderman
*Assistant Examiner*—Anne L. Damiano
(74) *Attorney, Agent, or Firm*—John L. Rogitz

(57) ABSTRACT

A method and system for promoting fault tolerance in a multi-node computing system that provides deadlock-free message routing in the presence of node and/or link faults using only two rounds and, thus, requiring only two virtual channels to ensure deadlock freedom. A lamb set of nodes for use in message routing is introduced, with each node in the lamb set being used only as points along message routes, and not for sending or receiving messages.

39 Claims, 3 Drawing Sheets

*OVERALL LOGIC*

SYSTEM

OVERALL LOGIC

OVERALL LOGIC FOR
DETERMINING "LAMB" SET OF NODES

LOGIC FOR FINDING PARTITIONS

LOGIC FOR FINDING REACHABILITY

PREFERRED LOGIC FOR REDUCTION TO WVC

ALTERNATE LOGIC FOR REDUCTION TO WVC

SYSTEM AND METHOD FOR FAULT TOLERANCE IN MULTI-NODE SYSTEM

BACKGROUND OF THE INVENTION

1. Field of the Invention

The present invention relates to multi-node computer systems.

2. Description of the Related Art

Multi-node computer systems have been provided to promote processing ability and speed. An example of such a system is IBM's Blue Gene petaflop supercomputer, which can have 32,000 nodes, with each node being established by a chip having perhaps dozens of microprocessors.

In a multi-node system, processing is undertaken by the nodes acting in concert with each other. Accordingly, the nodes communicate with each other in one of various network topologies, such as grids, meshes, hypercubes, and torus graphs.

Regardless of the topology, however, it is possible that one or more nodes or links between nodes might fail. "Fault tolerance" is a term that refers to the ability of a multi-node system to continue to operate effectively in the presence of such failures.

Specifically, when faults in the network occur, processing formerly undertaken by failed nodes must be assumed by the remaining good nodes, and messages between nodes must be routed around faulty nodes and links. Representative of past solutions to the route-around problem are those set forth in Boppana et al., "Fault-Tolerant Wormhole Routing Algorithms for Mesh Networks", *IEEE Trans. on Computers*, 44: 848–864 (1995) and Chalasani et al., "Communication in Multicomputers with Nonconvex Faults", *IEEE Trans. on Computers*, 46: 616–622 (1997), incorporated herein by reference. Boppana et al. disclose a method for message route-around that uses only two virtual channels to avoid a message routing interference problem known as "deadlock", provided that the fault regions are rectangular and the fault rings (non-faulty boundaries around fault regions) do not overlap. As used herein, "k virtual channels" means a physical channel (communication link) must be shared by k different channels, typically in a round-robin manner. Thus, the larger "k" is, the more the hardware cost in manufacturing the communication link.

The Boppana et al. method is extended to regions such as crosses, "L"s, and "T"s by Chalasani et al. using four virtual channels and again assuming that fault rings do not overlap. Chen et al., "A Fault-Tolerant Routing Scheme for Meshes with Nonconvex Faults", *IEEE Trans. on Parallel and Distributed Systems*, 12: 467–475, 2001 improve on Chalasani et al. in that fault rings are allowed to overlap, and only three virtual channels are required.

Unfortunately, as can be appreciated from the above discussion the latter two improvements over the relatively limited applicability of Boppana et al. require more than two virtual channels to guarantee deadlock avoidance. Moreover, all of the above-referenced methods assume that the number of "turns" in message routing through the system is not an issue, which in practical implementations may not be the case from a performance standpoint.

The present invention has recognized the above-noted problems and provides solutions to one or more of them as disclosed below.

SUMMARY OF THE INVENTION

To address one or more of the above-noted problems, a system and method are disclosed for routing messages in a multi-node computer system around faults in the system. A set of "lamb" nodes is defined to promote fault tolerance in the system. The "lamb" nodes are so called because, while lamb nodes are not failed nodes, they are used exclusively for message routing, and not for processing user's tasks or processes. Consequently, lamb nodes will not originate or receive messages.

Accordingly, a general purpose computer is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose computer system having multiple nodes includes a processor that executes method acts to promote tolerance of faults in the system. The method acts executed by the processor include determining a set of non-faulty nodes, which may be referred to as a "lamb set", based on the faults, and using nodes in the set of nodes only as points on routing paths of messages. No node in the set of nodes is used for sending or receiving messages.

In a preferred embodiment, small sets of partitions of prospective lamb nodes are found, with each partition including a representative node. This can include partitioning nodes in the system into maximal intervals of sequential nodes, with no node in an interval being a faulty node. At least some intervals are returned as a set of partitions.

Regardless of how the partitions have been determined, a reachability can next be determined from at least one representative node of a partition to at least another representative node of a partition. The reachability is used to establish a solution set, such that any node in the solution set can reach any other node in the solution set in at most k rounds, where k is the number of virtual channels in the communication links of the parallel system. As intended herein, k is chosen as a tradeoff among the hardware cost (larger k means more cost), the routing time (larger k means longer time for a message to travel along the communication links), and the size of the lamb set (larger k means a smaller lamb set and therefore more nodes available for processing). In one non-limiting embodiment, reachability can be computed by computing at least one reachability matrix using the partitions, computing at least one intersection matrix, and then returning a product of reachability and intersection matrices.

After determining reachability, the lamb set can be minimized if desired using a weighted graph G, such as but not limited to a weighted bipartite graph. This can include finding a vertex cover C of the graph G and, using selected elements of the vertex cover C, establishing the lamb set. Membership in the lamb set can depend, if desired, at least partially on a number of processors in a node that are malfunctioning or not functioning.

In another aspect, a computer program device includes a computer program storage device that is readable by a digital processing apparatus. A program is on the program storage device. The program includes instructions that can be executed by the digital processing apparatus for promoting fault tolerance in a multi-node system. The program can include means for designating a lamb set of nodes in the multi-node system to be used for routing messages within the system.

In yet another embodiment, a method for promoting fault tolerance in a multi-node system includes, for each of k rounds, finding multiple partitions of nodes, with each partition having a representative node. The method further includes, for each representative node, determining whether the node can reach at least one predetermined other representative node within a predetermined criteria. Also, the method can include minimizing the number of nodes and/or partitions using a weighted graph to establish a routing set of nodes. The routing set of nodes is returned for use thereof in routing messages through the system in the presence of one or more node and/or link faults.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
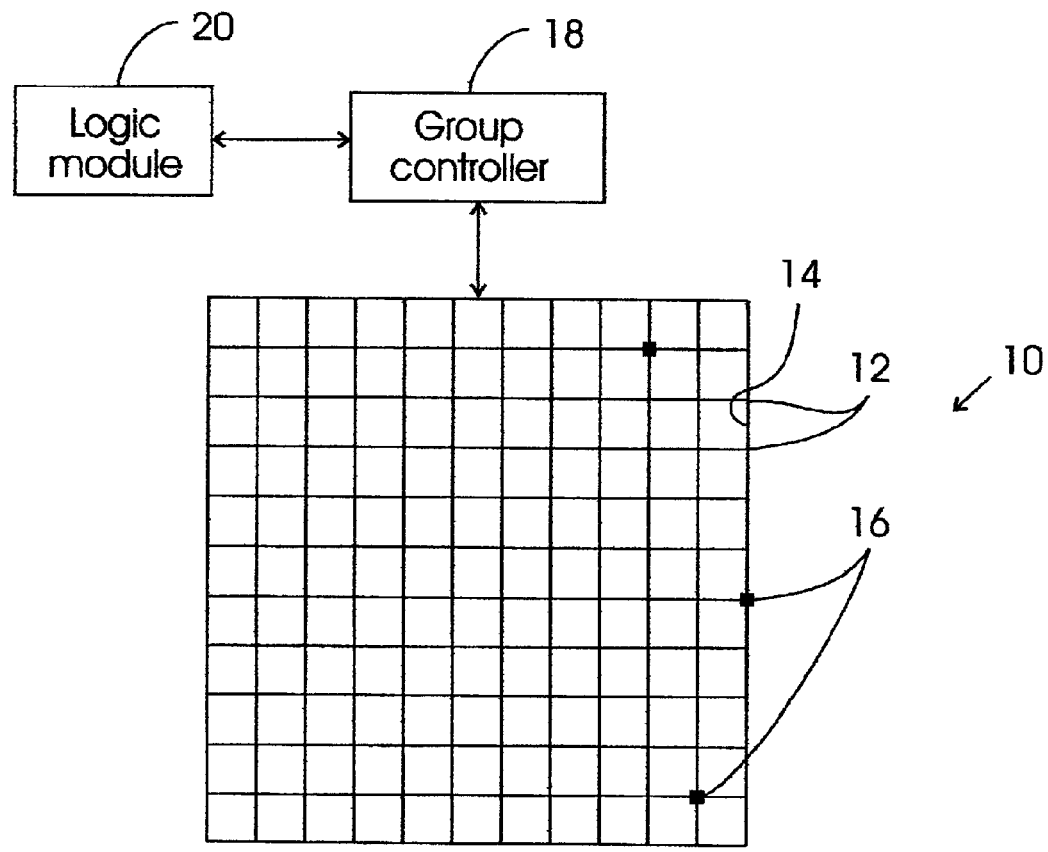
FIG. 1 is a schematic diagram showing the system of the present invention.

Referring initially to FIG. 1, a multi-node computing system is shown, generally designated 10. As shown, the system 10 includes a network of nodes 12 connected together by links 14. Some of the nodes are faulty nodes 16. Some links 14 may also fail as well; for convenience, a failed link 14 can be, but not must be, represented by modeling the nodes at the ends of the link 14 "faulty" nodes 16. It is one non-limiting purpose of the present invention to promote the tolerance of the system 10 to faulty nodes during operation.

In one intended embodiment, although illustrated in FIG. 1 as a 12×12 grid of nodes for simplicity, the computer system 10 may be a multi-node system such as, by way of non-limiting example only, IBM's Blue Gene system. While Blue Gene has a mesh topology, other systems and other topologies can be used, such as but not limited to grids, meshes, hypercubes, and torus graphs.

A group controller 18 communicates with a preferably software-implemented logic module 20 to execute the logic disclosed below in designating a set of "lamb" nodes to be used for routing messages through the system 10 in the presence of faulty nodes 16 and/or faulty links. By "lamb" node is meant a node whose processing capability is sacrificed for routing messages only; that is, a lamb node only routes messages, and does not send or receive messages.

While the controller 18 is shown for illustration as being separate from the nodes 12 of the system 10 and connected thereto for message routing purposes, it is to be understood that the present logic can be undertaken by one of the nodes 12 or distributed within the system 10 for coordinated processing between plural nodes 12.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor as a series of computer-executable instructions. These instructions may reside, for example, in RAM or on a hard drive or optical drive, or the instructions may be stored on a DASD array, magnetic tape, electronic read-only memory, or other appropriate data storage device. In an illustrative embodiment of the invention, the computer-executable instructions may be lines of compiled C++ compatible code.

Figure 2:
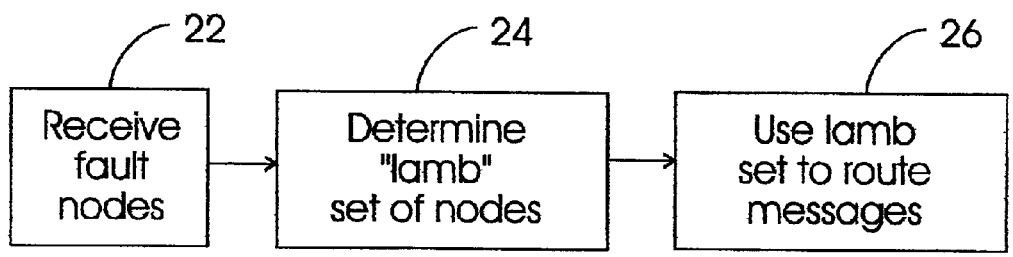
FIG. 2 is a flow chart of the overall logic.

Now referring to FIG. 2, the overall logic of the present invention can be seen. Commencing at block 22, the identities of the faulty nodes 16 are received. Moving to block 24, based on what nodes are faulty, a "lamb" set of nodes is determined as set forth further below. In block 26 the system removes or reallocates the user's jobs or processes running on all nodes in the lamb set to other healthy non-lamb nodes, thereby eliminating the possibility that messages will be sent from or received into any lamb node. However, the lamb set nodes are physically functioning nodes and are used to route by-passing messages as any other healthy, non-lamb node.

In the following, definitions are set forth that assume that the interconnection network has a d-dimensional structure, in describing one presently preferred embodiment. It is to be understood that the below definitions can be modified for a general interconnection network. For example, the π-routing or π-ordered routing can be generalized to any routing on any interconnection network.

"d" represents the number of dimensions of the system 10 topology, e.g., the dimensions of a mesh;

<v,w> represents a link from a source node v to a destination node w;

"dimension-ordered routing" is a static routing in which every message travels according to the same predetermined order of dimensions. An ordering is specified by a permutation π of $\{1, 2, \ldots, d\}$, and the resulting dimension-ordered routing is called π-routing. In the case of faulty nodes, a single round of π-routing from one node to another may not always be sufficient, and up to "k" rounds consequently may be necessary, with each round using a different virtual channel from the other rounds to avoid deadlock. In this case a routing is specified by a vector "$\pi_{vector}$"=$\pi_1, \ldots \pi_k$ of "k" 1-round orderings, where for $1 \leq i \leq k$ the $\pi_i$-routing is used during the $i^{th}$ round. In one non-limiting embodiment k=2;

F=set of faulty nodes and links;

$F_L$=set of faulty links;

$F_N$=set of faulty nodes;

a node "$u_i$" can $(F, \pi_i)$-reach a node $u_{i+1}$ if the $\pi_i$-routing from $u_i$ to $u_{i+1}$ does not pass through any faulty node or link;

F/c=set of faults on (d−1)-dimensional mesh obtained by taking all node and link faults in F whose last coordinate is "c", and truncating this last coordinate;

a destination node "w" is $(k,F,\pi_{vector})$-reachable from a source node "v", and "v" can $(k,F,\pi_{vector})$-reach "w", if there exists nodes $u_0, u_1, \ldots, u_k$ such that $u_0$=v, $u_k$=w, and $u_1$ can $(F,\pi_t)$-reach $u_{i+1}$ for $0\leq i<k$;

a source equivalence class (SEC) is a maximal set of non-faulty nodes v that all have the same reachability properties, i.e., all source nodes in a SEC can reach, in one round, the same destination nodes by π-ordered routing;

a destination equivalence class (DEC) is a maximal set of non-faulty nodes v that all have the same reachability properties, i.e., all destination nodes in a DEC can be reached, in one round, from the same source nodes by π-ordered routing;

a source equivalence subclass (SES) is any nonempty subset of an SEC, and a destination equivalence subclass (DES) is any nonempty subset of a DEC;

a subset V of the nodes of the system is a $(k,F,\pi_{vector})$ survivor set if, for all v, w ∈V, v can $(k,F,\pi_{vector})$-reach w; in particular, $V \cap F_N$=0. A subset $\Lambda \subseteq$ all nodes is a $(k,F,\pi_{vector})$-sacrificial lamb set, for short, a $(k,F,\pi_{vector})$-lamb set, if $\Lambda \cap F_N$=0 and the set M of all nodes−$(\Lambda \cup F_N)$ is a $(k,F,\pi_{vector})$-survivor set, such that, by disallowing nodes in the lamb set to send or receive messages but allowing them to be on the routing paths of messages, all nonfaulty nodes not in the lamb set can communicate with each other in at most k rounds: finding a maximal survivor set, which is equivalent to finding a minimal lamb set, for a given dimensionality, fault set, and route ordering, is one purpose of the present invention.

Figure 3:
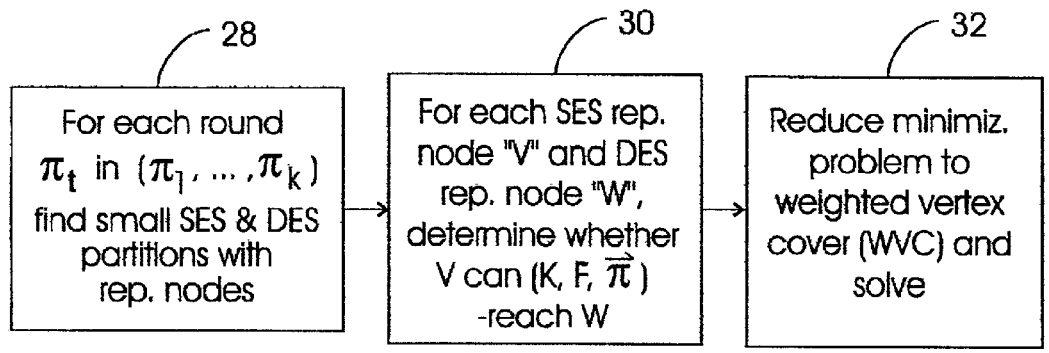
FIG. 3 is a flow chart of the generalized logic for finding the lamb set.

FIG. 3 shows the overall logic for determining the lamb set at block 24 in FIG. 2. Starting at block 28 in FIG. 3, for each potential round $\pi_t$ in the set of rounds $(\pi_1, \ldots, \pi_k)$, small source (SES) and destination (DES) partitions of non-faulty nodes are determined, with each partition having a representative node. Details of the preferred non-limiting way to find the partitions are set forth further below in reference to FIG. 4. Essentially, the SES partitions of the non-faulty nodes in the system 10 are pairwise disjoint (between "i" and "j" for any "i" not equal to "j". The DES partitions likewise are pairwise disjoint. The union of all partitions encompasses all the non-faulty nodes in the system 10.

Then, at block 30 for each source SES partition, it is determined whether its representative node "v" can reach each representative node "w" of each destination DES partition within a predetermined reachability criteria. More specifically, it is determined, for each "v", whether it can (k, F, $\pi_{vector}$)-reach each destination DES representative node "w", wherein "k" is the number of rounds and F is the set of faulty nodes and links. Details of a preferred implementation of block 30 are set forth further below in reference to FIG. 5.

All SES/DES that do not satisfy the reachability test of block 32 are candidates for the lamb set and are sent to block 32, the goal of which is to prune the candidates and, thus, minimize the size of the lamb set. As set forth further below in reference to FIGS. 6 and 7, the lamb set minimization problem of block 32 is solved by reducing the problem to a weighted graph cover problem (e.g., a weighted vertex cover problem) and solving the weighted graph problem.

Figure 4:
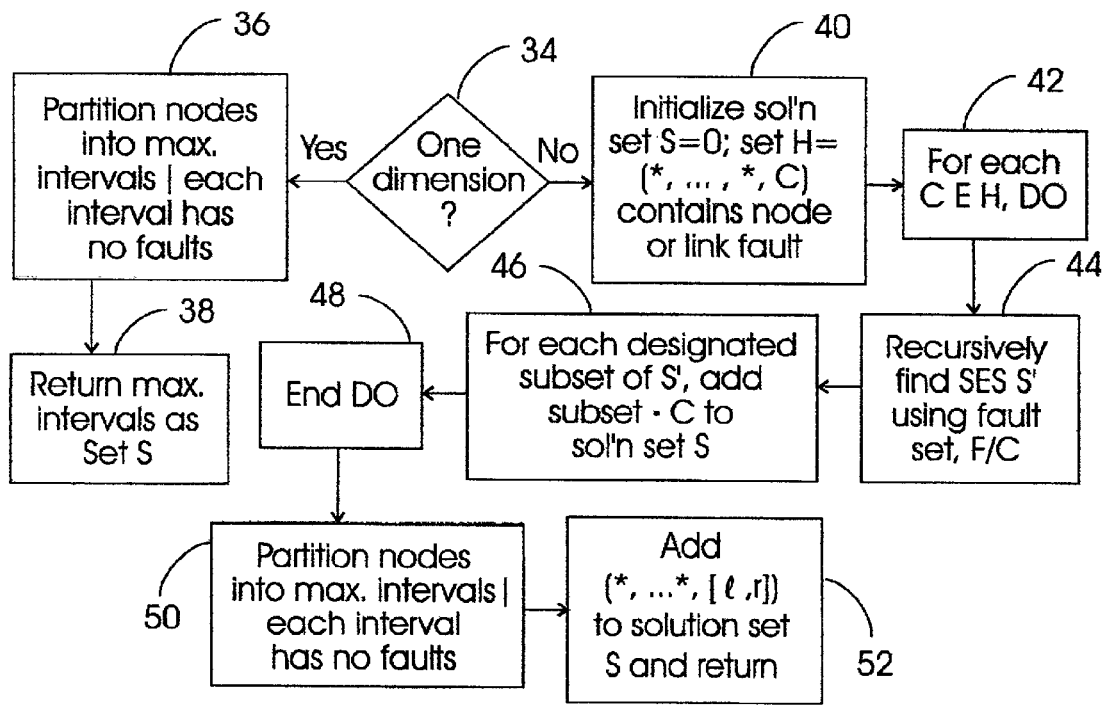
FIG. 4 is a flow chart of the logic for finding SES and DES partitions.

Now referring to FIG. 4, the details of one preferred, non-limiting logic for partitioning the non-faulty nodes into SES partitions is shown. It is to be understood that the nodes are partitioned into DES using the same logic, except that the recursion considers coordinates from left to right in the DES case instead of from right to left as in the SES case.

In the discussion below, using, by way of non-limiting illustration only, a rectangular subset of nodes of a mesh $M=M_d(n_1, \ldots, n_d)$, each coordinate "j" can be designated by one of three objects: "*", meaning that any value $v_j$ with $0 \leq v_j < n_j$ can appear in the coordinate, an interval $[l_j, r_j]$, meaning that any value $v_j$ with $l_j \leq v_j \leq r_j$ can appear in the coordinate, and a constant $c_j$, meaning that only the value $c_j$ can appear in the coordinate. The below algorithm finds SES's of the form $S =(*, \ldots, *, [l_j, r_j], c_{j+1}, \ldots, c_d)$ and DES's of the form $D=(c_1, \ldots, c_{j-1}, [l_j, r_j], *, \ldots, *)$. The representative node of an SES is of the form $(0, \ldots 0, 1_j, c_{j+1}, \ldots, c_d)$ and of a DES is $(c_1, \ldots, c_{j-1}, 0, \ldots 0)$.

While the discussion below describes the algorithm recursively, it is to be understood that other implementations can be used. For instance, at the start of the algorithm the faults can be sorted by radix sort with the significance of the coordinates increasing from left to right, and with calls to the algorithm below the top level adding SES's directly to the solution set, rather than passing them up to the calling program. It is to be further understood that, without loss of generality, the π ordering is assumed to be in ascending order (1,2, . . . ,d). For a general π ordering $(j_1, \ldots, j_d)$, the algorithm is modified to consider the coordinates in the reverse order given by π.

An input to decision diamond 34 is a d-dimensional mesh of the form $n_1$ by $n_2$ by ... by $n_d$, denoted $M_d(n_1, \ldots, n_d)$. Also input is the set F of faulty nodes.

Commencing at decision diamond 34, it is determined whether the system 10 is one-dimensional, i.e., whether d=1. If so, the logic flows to block 36 to partition the non-faulty nodes into maximal intervals $[l_1, r_1], \ldots, [l_m, r_m]$ such that each interval contains no node fault or link fault. Then, at block 38 the solution set, i.e., the set of maximal intervals, is returned.

On the other hand, when d>1 the logic moves from decision diamond 34 to block 40 to initialize the solution set to zero and to define a fault set H of values "c" such that (*, . . . *,c) contains either a node fault or a link fault. Proceeding to block 42, a DO loop is entered for each value "c" in the fault set H. At block 44, a find SES Partition is called wherein an SES partition "SES" is found on an input $(d−1, n_1, \ldots, n_{d-1})$ and F/c. Then, moving to block 46, for each of the SES's found at block 44, its product with "c" is added to the solution set, i.e., S'·c, which is of the form $(*, \ldots, *, [l_j, r_j], c_{j+1}, \ldots, c_{d-1}, c)$, is added to the solution set. The DO loop ends at block 48.

After completing the DO loop the logic proceeds to block 50 to partition the values that are not in H into maximal intervals [l, r] such that (*, . . . *,[l,r]) contains no node fault or link fault. At block 52, for each maximal interval [l,r], (*, . . . *,[l,r]) is added to the solution set, which is returned.

To save memory, each SES partition and DES partition can be computed at the point where the below-described reachability matrix R is needed, after which the reachability matrix and associated partitions can be erased. It is to be understood that while the logic of FIG. 4 applies particularly to mesh topologies, in other topologies the partitions can be found by explicitly computing the reachability sets (as a source and as a destination) for each node.

Figure 5:
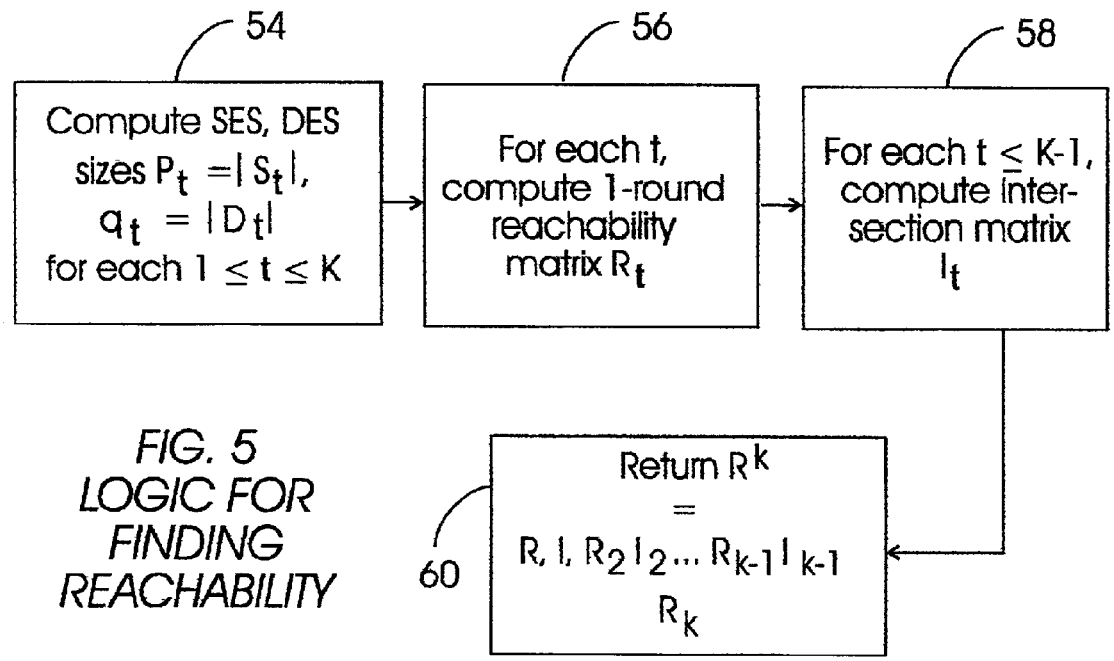
FIG. 5 is a flow chart of the logic for determining reachability.

Now referring to the reachability algorithm of FIG. 5, commencing at block 54, for each "t" in $1 \leq t \leq k$, $p_t$ is defined to be the size of the corresponding SES in the solution set from FIG. 4 (with "π" being understood to be $\pi_t$), $S_{t,i}$ is the $i^{th}$ partition in this solution set, $s_{t,i}$ is its representative node, $q_t$ is the size of the corresponding DES in the solution set of FIG. 4 (with "$\pi$" being understood to be $\pi_t$), $D_{t,j}$ is the $j^{th}$ partition in this solution set, and $d_{t,j}$ is its representative node.

Moving to block 56, for each "t" in $1 \leq t \leq k$, the one-round reachability entries of a $p_t \times q_t$ reachability matrix "$R_t$" are computed, where $R_t(i,j)=1$ iff $s_{t,i}$ can $(F,\pi_t)$-reach $d_{t,j}$.

Next, proceeding to block 58, for $1 \leq t \leq k-1$, the entries of a $q_t \times P_{t+1}$ intersection matrix I are computed, where $I_t(j,i)=1$ iff $D_{t,j} \cap S_{t+1,1} \neq 0$. The product $R^k$ of the matrices, i.e., $R_1 I_2 R_2 I_2 \ldots R_{k-1} I_{k-1} R_k$ is returned. If the same ordering $\pi$ and same SES and DES partitions are used in each round, the algorithm can be simplified because in such a case $R_1 = R_2 = \ldots = R_k$ and likewise the intersection matrices are equal to each other.

Define $p=p_1$ and $q=q_k$. The product $R^k$, rectangular abbreviations $S_1, \ldots, S_p$ for the partitions $S_{1,1}, \ldots, S_{1,p}$, and rectangular abbreviations $D_1, \ldots, D_q$ for the partitions $D_{k,1}, \ldots, D_{k,q}$ are sent from the logic of FIG. 5 to the logic of FIG. 6. Commencing at block 62, a weighted bipartite graph G is constructed with vertex partition $\{s_1, \ldots, s_p\}$ and $\{d_1, \ldots, d_q\}$. As recognized herein, an edge between $s_i$ and $d_j$ exists iff $R_k(i,j)=0$. The weights are $w(s_i)=|S_i|$ and $w(d_j)=|D_j|$. Moreover, the weights can be made not only a function of the size of a set of nodes, but also of individual node values that are based on the number of processors in the node that function properly (or equivalently that are malfunctioning). The individual node values can be added to or multiplied by the size value. In this way, a node (e.g., a chip in a multiprocessor) that has only one good processor and that consequently would be a good candidate to be a lamb node (since not much processing capability is lost by sacrificing it) is more likely to be chosen as a lamb node.

Moving to block 64, a minimum weight vertex cover C is determined for the graph G in accordance with principles known in the weighted graph art and returned. The lamb set is returned at block 66 as the union of those SES partitions $S_i$ with $s_i \in C$ and those $D_j$ with $d_j \in C$.

Figure 6:
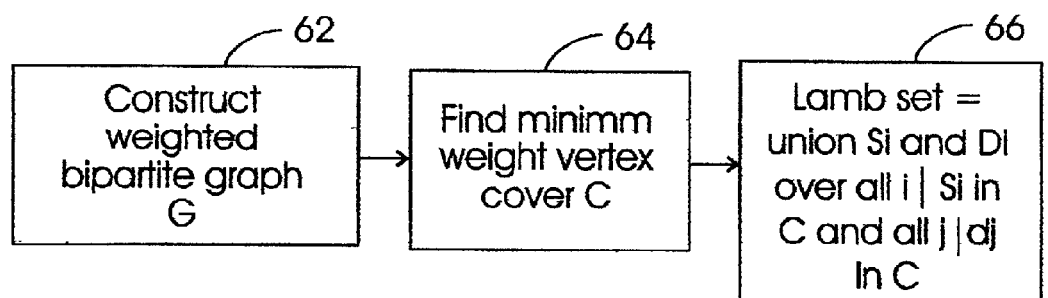
FIG. 6 is a flow chart of the preferred logic for reducing the minimization problem to a weighted vertex cover (WVC) problem on a bipartite graph.
Figure 7:
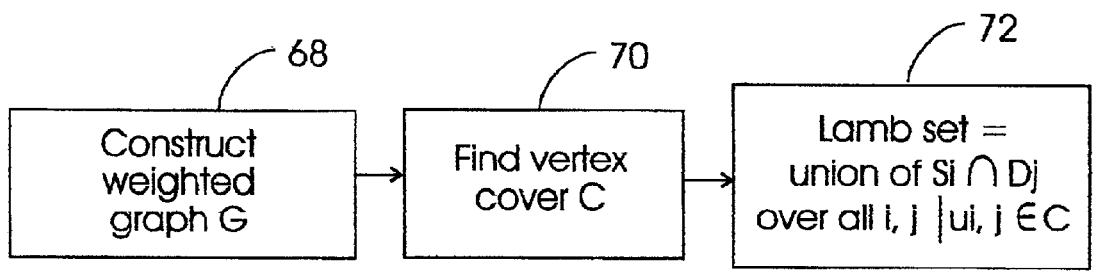
FIG. 7 is a flow chart of the general logic for reducing the minimization problem to a weighted vertex cover (WVC) problem on a general graph.

Instead of the logic of FIG. 6, the logic of FIG. 7 can be used to minimize the lamb set. Commencing at block 68, a weighted graph G is constructed with vertices $U=\{u_{i,j} | S_i \cap D_j \neq 0\}$. As recognized herein, an edge between $u_{i,j}$ and $u_{i',j'}$ exists iff either $R^k(i,j')=0$ or $R^k(i',j)=0$. The weights are $w(u_{i,j})=|S_i \cap D_j|$.

Moving to block 70, a vertex cover C is determined for the graph G in accordance with principles known in the weighted graph art and returned. The lamb set is returned at block 72 as the union of those SES partitions $S_i \cap D_j$ over all (i,j) such that $_{i,j} \in C$.

While the particular SYSTEM AND METHOD FOR FAULT TOLERANCE IN MULTI-NODE SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A general purpose computer system having multiple nodes, comprising:
   at least one processor executing method acts to promote tolerance of faults in the system, the method acts comprising:
   based at least in part on the faults, determining a set of nodes; and
   using nodes in the set of nodes only as points on routing paths of messages, and not using any node in the set of nodes for sending or receiving messages.

2. The system of claim 1, wherein the set is a lamb set.

3. The system of claim 2, wherein the act of determining undertaken by the processor includes:
   finding small sets of partitions of candidate lamb nodes, each partition including a representative node.

4. The system of claim 3, wherein the act of finding undertaken by the processor includes:
   partitioning nodes in the system into maximal intervals of sequential nodes, no node in an interval being a faulty node.

5. The system of claim 4, wherein the act of finding undertaken by the processor further includes:
   returning at least some intervals as at least one set of partitions.

6. The system of claim 3, wherein the act of determining undertaken by the processor includes:
   determining a reachability from at least one representative node to at least another representative node; and
   using the reachability to establish a solution set, such that any node in the solution set can reach any other node in the solution set in at most k rounds.

7. The system of claim 6, wherein the act of determining a reachability undertaken by the processor includes:
   computing at least one reachability matrix, using the solution set.

8. The system of claim 7, wherein the act of determining a reachability undertaken by the processor further includes:
   computing at least one intersection matrix.

9. The system of claim 8, wherein the act of determining a reachability undertaken by the processor further includes:
   returning at least one product of at least one reachability matrix and at least one intersection matrix.

10. The system of claim 6, wherein k equals two.

11. The system of claim 6, wherein the act of determining undertaken by the processor includes:
    minimizing a solution set using at least one weighted graph G.

12. The system of claim 11, wherein the weighted graph is a weighted bipartite graph.

13. The system of claim 11, wherein the act of minimizing undertaken by the processor includes:
    finding at least one vertex cover C of the graph G.

14. The system of claim 13, wherein the act of minimizing undertaken by the processor further includes:

using selected elements of the vertex cover C, establishing the lamb set.

15. The system of claim 1, wherein membership in the set of nodes depends at least partially on a number of processors in a node that are malfunctioning or not functioning.

16. A computer program device comprising:
   a computer program storage device readable by a digital processing apparatus; and
   a program on the program storage device and including instructions executable by the digital processing apparatus for promoting fault tolerance in a multi-node system, the program comprising:
   means for designating a lamb set of nodes in the multi-node system to be used for routing messages within the system; and
   means for finding small sets of partitions of prospective lamb nodes, each partition including a representative node.

17. The device of claim 16, wherein the lamb set of nodes contains nodes that are used only in messages routes.

18. The device of claim 16, wherein the means for finding includes:
   means for partitioning nodes in the system into maximal intervals of sequential nodes, no node in an interval being a faulty node.

19. The device of claim 18, wherein the means for finding includes:
   means for returning at least some intervals as at least one set of partitions.

20. The device of claim 16, wherein the means for designating includes:
   means for determining a reachability from at least one representative node to at least another representative node; and
   means for using the reachability to establish a solution set, such that any node in the solution set can reach any other node in the solution set in at most k rounds.

21. The device of claim 20, wherein the means for designating includes:
   means for computing at least one reachability matrix;
   means for computing at least one intersection matrix; and
   means for returning at least one product of at least one reachability matrix and at least one intersection matrix.

22. The device of claim 20, wherein k equals two.

23. The device of claim 16, wherein the means for designating includes:
   means for minimizing a solution set using at least one weighted graph G.

24. The device of claim 23, wherein the weighted graph is a weighted bipartite graph.

25. The device of claim 23, wherein the means for minimizing includes:
   means for finding at least one vertex cover C of the graph C.

26. The device of claim 25, further comprising:
   means for using selected elements of the vertex cover C to establish the lamb set.

27. The device of claim 16, wherein membership in the lamb set of nodes depends at least partially on a number of processors in a node that are malfunctioning or not functioning.

28. A method for promoting fault tolerance in a multi-node system, comprising the acts of:
   for each of k rounds, finding multiple partitions of nodes, each partition having a representative node;
   for each representative node, determining whether the node can reach at least one predetermined other representative node within a predetermined criteria;
   minimizing the number of nodes and/or partitions using a weighted graph to establish a routing set of nodes; and
   returning the routing set of nodes for use thereof in routing messages through the system in the presence of one or more node and/or link faults.

29. The method of claim 28, wherein the number of rounds is at most two.

30. The method of claim 28, wherein the number of rounds is two and only two.

31. The method of claim 28, wherein the weighted graph accounts for at least one node weight, the node weight being based at least on a number of operational processors in the node.

32. The method of claim 28, wherein the routing set of nodes is a lamb set containing nodes that are used only for routing messages.

33. The method of claim 28, further comprising finding small sets of partitions of prospective lamb nodes, each partition including a representative node.

34. The method of claim 33, comprising partitioning nodes in the system into maximal intervals of sequential nodes, no node in an interval being a faulty node.

35. The method of claim 34, comprising returning at least some intervals as at least one set of partitions.

36. The method of claim 28, wherein the act of determining whether the node can reach at least one predetermined other node comprises:
   determining a reachability from as least one representative node to at least another representative node; and
   using the reachability to establish the routing set, such that any node in the routing set can reach any other node in the routing set in at most k rounds.

37. The method of claim 36, wherein the act of determining whether the node can reach at least one predetermined other node comprises:
   computing at least one reachability matrix:
   computing at least one intersection matrix; and
   returning at least one product of at least one reachability matrix and at least one intersection matrix.

38. The method of claim 28, wherein the act of minimizing includes:
   finding at least one vertex cover of the weighted graph; and
   using selected elements of the vertex cover to establish the routing set.

39. The method of claim 28, wherein the weighted graph is a weighted bipartite graph.

* * * * *